United States Patent [19]

Hagin et al.

[11] 4,446,756

[45] May 8, 1984

[54] POWER DIVIDER GEARBOX WITH A PLANETARY DIFFERENTIAL GEAR DRIVE

[75] Inventors: Faust Hagin; Hans J. Drewitz, both of Munich, Fed. Rep. of Germany

[73] Assignee: Maschinenfabrik Augsburg-Nurnberg Aktiengesellschaft, Fed. Rep. of Germany

[21] Appl. No.: 215,146

[22] Filed: Dec. 10, 1980

[30] Foreign Application Priority Data

Dec. 15, 1979 [DE] Fed. Rep. of Germany ....... 2950619

[51] Int. Cl.³ .................... F16H 47/04; F16H 37/06
[52] U.S. Cl. .................................. 74/687; 74/720.5; 74/677
[58] Field of Search ................. 74/687, 572, 677, 688, 74/681, 720.5

[56] References Cited

U.S. PATENT DOCUMENTS

| | | | |
|---|---|---|---|
| 3,869,939 | 3/1975 | Miyao et al. | 74/687 |
| 3,884,095 | 5/1975 | Miyao et al. | 74/687 |
| 4,096,768 | 6/1978 | Miyao | 74/865 |
| 4,242,922 | 1/1981 | Baudoin | 74/687 |
| 4,291,592 | 9/1981 | Meyerle et al. | 74/687 |
| 4,313,351 | 2/1982 | Hagin | 74/687 |

FOREIGN PATENT DOCUMENTS 2655011  6/1978  Fed. Rep. of Germany ........ 74/687

*Primary Examiner*—Allan D. Herrmann
*Assistant Examiner*—D. Wright
*Attorney, Agent, or Firm*—Scully, Scott, Murphy & Presser

[57] ABSTRACT

A power divider gearbox including a planetary differential gear drive, comprising dual planetary gears which mesh with two sun gears having different diameters and with an internal ring gear, wherein the planetary differential gear drive divides the incoming power input transmitted to the power divider gearbox through an input shaft into a mechanical branch and into a hydraulic branch (displacement machine) and in which the last-mentioned branch is connected to the internal ring gear of the planetary differential gear drive.

6 Claims, 1 Drawing Figure

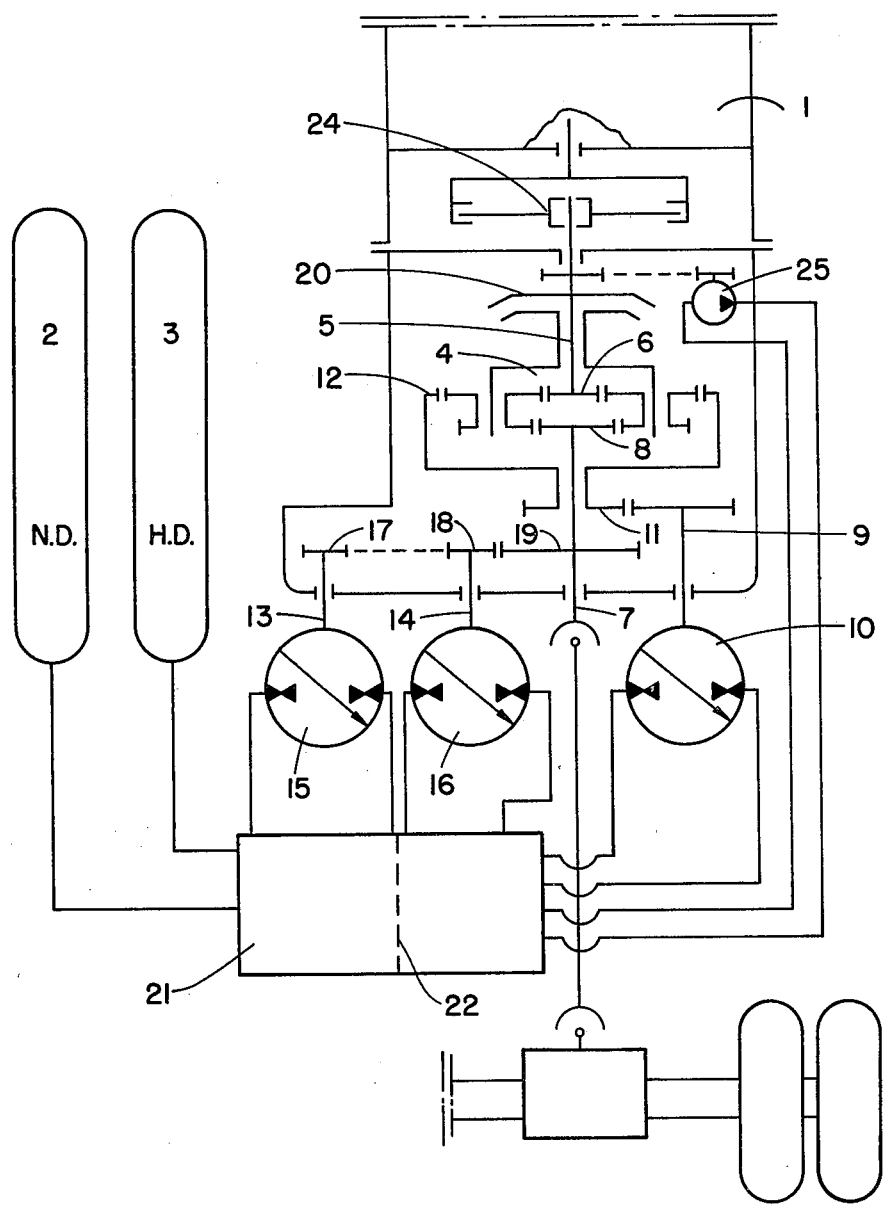

POWER DIVIDER GEARBOX WITH A PLANETARY DIFFERENTIAL GEAR DRIVE

BACKGROUND OF THE INVENTION

1. Field of the Invention

The present invention relates to a power divider gearbox including a planetary differential gear drive, comprising dual planetary gears which mesh with two sun gears having different diameters and with an internal ring gear, wherein the planetary differential gear drive divides the incoming power input transmitted to the power divider gearbox through an input shaft into a mechanical branch and into a hydraulic branch (displacement machine) and in which the last-mentioned branch is connected to the internal ring gear of the planetary differential gear drive.

2. Discussion of the Prior Art

A power divider gearbox of the type discussed has already been disclosed in the earlier German Patent Application No. P 29 04 572.5-12. The foregoing solves the task of eliminating the last power circulating within the gearbox and of holding the hydrostatic power component to a minimum relative to the total power transmitted. In order to attain this task, in the gearbox or drive as previously mentioned there is employed a switching or clutch coupling, by means of which through mechanical shifting there can be set a first and a second shift operating mode of the gearbox or drive.

SUMMARY OF THE INVENTION

Accordingly, it is a primary object of the present invention to provide a power divider gearbox or drive of the type described which eliminates the need for such a mechanical clutch coupling and which facilitates the direct coupling of the gearbox output shaft to the gearbox input shaft (direct gear).

It is a more specific object of the present invention to provide a power divider drive or gearbox of the above type wherein a first sun gear of a larger diameter is torsionally rigidly connected with the gearbox output shaft and a second sun gear having a smaller diameter is connected with the gearbox input shaft.

Through the arrangement of the power divider gearbox in accordance with the present invention there is concurrently transmitted over the entire operating range only a minute power component through the hydraulic branch, and when the controlling displacement machine is operating as a motor, there is provided the capability of mechanically coupling the collective members of the planetary differential gear drive. An additional advantage is achieved in that the drive motor which operates in conjunction with the power divider gearbox can be driven at a relatively low speed, in effect within a range where the fuel consumption is favorable.

In a preferred constructional embodiment of the present invention, a first displacement machine in the hydraulic branch, which is coupled with the internal ring gear can be energetically coupled with at least two further so-called output displacement machines, both of which are mechanically coupled to the output shaft of the gearbox. The utilization of at least two output displacement machines is the prerequisite that hydraulic power is efficiently transmissible over a relatively wide power range.

A particular advantage is afforded through the employment of at least one hydraulic high-pressure accumulator to which there can be connected one or more of the displacement machines. This modification of the present invention facilitates that, for instance, one output displacement machine can operate together with the controlling displacement machine, whereas the other output displacement machine is either in the zero position or operates at low idling speed and, accordingly, at low losses, or operates with the charged hydraulic high-pressure accumulator. This last mode of operation assumes a special significance since the prerequisite therefor is that it permits a relatively small-sized controlling displacement machine to be employed without having to constantly operate it within the maximum load range or, on the other hand having to operate the prime mover by means of a complicated control in the low torque range and thereby, again, at poor specific consumption.

A further advantageous aspect of the present invention consists of in the provision of a clutch coupling by means of which there can be torsionally rigidly interconnected two shafts (for example, cage and sun gear shaft, or cage and ring gear shaft, or ring gear shaft and sun gear shaft) of the planetary differential gear drive. Due to this inventive arrangement it becomes possible, within one operating range, in which the controlling displacement machine operates as a motor and thereby the synchronized rotational speed reigns between the gearbox input shaft and output shaft, to be able to mechanically couple the input shaft. This reduces the hydraulic component of the total power transmitted to zero.

In a further preferred embodiment of the present invention, a free-wheeling unit is arranged in the input shaft which allows for a higher rotational speed of the input shaft than that of a drive motor. This free-wheeling arrangement achieves that, at a usable braking, the hydraulic displacement machines will operate as pumps and charge the high-pressure accumulator whereby the controlling displacement machine can be stationary and the drive motor runs at idling speed so that, overall, only the minimum idling losses much be taken into the design considerations.

BRIEF DESCRIPTION OF THE DRAWING

Further objects and constructional aspects of the present invention will become apparent from the following detailed description of a preferred embodiment, taken in conjunction with the accompanying simple FIGURE of the drawing, illustrating a schematic arrangement of an inventive power divider gearbox.

DETAILED DESCRIPTION

In the drawing, a drive motor or prime mover 1, which preferably is a diesel engine, is connected to the power divider gearbox or drive through a usual coupling. The power divider gearbox includes an input shaft 5 and an output shaft 7. Connected to the output shaft 7 is a cardan shaft leading to the axle drive gear of the drive axle of a vehicle. Arranged in the input shaft 5 is a free-wheeling unit 24 which permits the engine speed to lag behind the speed of the input shaft 5. The core member of the power divider gearbox is formed by a planetary differential gear drive having two sun gears 6, 8, a cage 4, and dual planetary pinions. The first sun gear 8 which has a larger diameter is torsionally rigidly connected to the output shaft 7, while the second sun gear 6 which has a smaller diameter is torsionally rigidly connected to the input shaft 5. The cage 4 of the planetary differential gearset is torsionally rigidly connectable by means of a clutch coupling 20 to, respectively, the input shaft 5 or the output shaft 7. The dual planetary pinions of the planetary differential gear drive mesh with an internal ring gear 12 which is mechanically connected through a gear 11 to the shaft 9 of a controlling displacement machine 10.

The controlling displacement machine 10 is a variable displacement machine which is operable in one direction as a pump and as a motor in the other. This displacement machine 10 is hydraulically coupled to two output displacement machines 15, 16 constructed in a similar manner where the coupling effect is achieved through a hydraulic control apparatus 21 which is so designed that the displacement machines 15, 16 can be controlled independently of one another, and can be connected independently of one another to a high-pressure accumulator 3. Also the controlling displacement machine 10 is connectable to the high-pressure accumulator through the control apparatus 21. The independence of this control of the output displacement machines 15, 16 is represented by the phantom line 22 in the control apparatus 21. The control pressure for the control apparatus 21 is provided by a control pressure pump 25 which is mechanically connected to the input shaft 5. Both output displacement machines 15, 16 are mechanically and torsionally rigidly connected, through the shafts 13, 14 and corresponding gears 17, 18, to a gear 19 seated on the output shaft 7.

For the formation of the low-pressure level, a low-pressure accumulator 2 is provided adjacent to the high-pressure accumulator 3.

We claim:

1. In a power divider gearbox having an input shaft and an output shaft and including a planetary differential gear drive comprising dual planetary pinions, two sun gears having different diameters and an internal ring gear meshing with said pinions, said planetary differential gear drive dividing the power transmitted to the power divider gearbox through the input shaft into a mechanical branch and a hydraulic branch, said hydraulic branch being connected to the internal ring gear; the improvement comprising: a first of said sun gears having a large diameter and being torsionally rigidly connected with the gearbox output shaft, and the second of said sun gears having a small diameter and being connected to the gearbox input shaft.

2. Power divider gearbox as claimed in claim 1, comprising a first displacement machine in said hydraulic branch being coupled with the internal ring gear and energetically coupled with at least two further output displacement machines being mechanically coupled to the output shaft of said gearbox.

3. Power divider gearbox as claimed in claim 2, comprising at least one hydraulic high-pressure accumulator for connection to at least one of said displacement machines.

4. Power divider gearbox as claimed in claim 2, wherein said output displacement machines are controlled independently of each other.

5. Power divider gearbox as claimed in claim 1, said planetary differential gear drive including two cooperating shafts, and a clutch coupling for torsionally rigidly inter-connecting said two cooperating shafts of the planetary differential gear drive.

6. Power divider gearbox as claimed in claim 1, comprising a free-wheeling arrangement located in said input shaft to facilitate the rotational speed of the input shaft to exceed the speed of a prime mover.

* * * * *